United States Patent
Morinaka

(10) Patent No.: US 10,570,768 B2
(45) Date of Patent: Feb. 25, 2020

(54) LABYRINTH SEAL

(71) Applicant: Kobe Steel, Ltd., Hyogo (JP)

(72) Inventor: Shunsuke Morinaka, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 169 days.

(21) Appl. No.: 15/740,831

(22) PCT Filed: Jun. 6, 2016

(86) PCT No.: PCT/JP2016/066773
§ 371 (c)(1),
(2) Date: Dec. 29, 2017

(87) PCT Pub. No.: WO2017/006678
PCT Pub. Date: Jan. 12, 2017

(65) Prior Publication Data
US 2018/0187567 A1   Jul. 5, 2018

(30) Foreign Application Priority Data
Jul. 3, 2015  (JP) .................................. 2015-134119

(51) Int. Cl.
*F01D 11/02*  (2006.01)
*F04D 29/10*  (2006.01)
*F16J 15/447*  (2006.01)

(52) U.S. Cl.
CPC .............. *F01D 11/02* (2013.01); *F04D 29/10* (2013.01); *F16J 15/4472* (2013.01)

(58) Field of Classification Search
CPC ....... F16J 15/447; F16J 15/4472; F01D 11/02
See application file for complete search history.

(56) References Cited

U.S. PATENT DOCUMENTS 1,708,044 A  *  4/1929  Baumann .............. F01D 11/001
                                                        277/418
1,756,958 A  *  5/1930  Schmidt ................. F01D 11/02
                                                        415/131

(Continued)

FOREIGN PATENT DOCUMENTS

JP         S51-82855     *   7/1976
JP         2012-072736 A    4/2012

(Continued)

OTHER PUBLICATIONS

International Search Report issued in PCT/JP2016/066773; dated Aug. 2, 2016.

*Primary Examiner* — Nicholas L Foster
(74) *Attorney, Agent, or Firm* — Studebaker & Brackett PC

(57) ABSTRACT

A labyrinth seal suppresses leakage of fluid through a gap between a circumferential outer surface of a rotating body, having an axis of rotation, and a circumferential inner surface of a stationary body provided on an outer side of the rotating body, by increasing fluid energy loss caused by vortices. Said leakage occurs in an axial direction from a high pressure to a low pressure side. A step is formed on the outer surface such that the diameter of the low pressure side is smaller than that of the high pressure side. A fin extending radially inward from the inner surface is formed on at least the low pressure side of the step. An annular groove is formed to extend in a circumferential direction in the outer surface, in at least one portion of the area axially between the step and the fin.

15 Claims, 7 Drawing Sheets

(56) References Cited

U.S. PATENT DOCUMENTS

| | | | | |
|---|---|---|---|---|
| 2,123,818 | A * | 7/1938 | Wegmann | F16J 15/4472 277/419 |
| 3,231,285 | A * | 1/1966 | Weltmer | F16J 15/4472 277/418 |
| 3,940,153 | A * | 2/1976 | Stocker | F16J 15/4472 277/418 |
| 4,335,886 | A * | 6/1982 | Frey | F16J 15/4472 277/412 |
| 5,029,876 | A * | 7/1991 | Orlando | F16J 15/4472 277/419 |
| 5,181,728 | A * | 1/1993 | Stec | F01D 11/001 277/355 |
| 5,228,700 | A * | 7/1993 | Biesold | F16J 15/4474 277/421 |
| 5,244,216 | A * | 9/1993 | Rhode | F16J 15/4472 277/303 |
| 5,823,740 | A * | 10/1998 | Cybularz | F03B 3/02 415/115 |
| 5,924,844 | A * | 7/1999 | Cybularz | F03B 3/02 415/1 |
| 6,164,655 | A * | 12/2000 | Bothien | F16J 15/447 277/303 |
| 7,445,213 | B1 * | 11/2008 | Pelfrey | F01D 11/02 277/418 |
| 9,650,907 | B2 * | 5/2017 | Bricaud | F01D 11/02 |
| 10,281,046 | B2 * | 5/2019 | Daussin | F16J 15/4472 |
| 2011/0070074 | A1 * | 3/2011 | Schabowski | F01D 11/08 415/174.5 |
| 2011/0250073 | A1 * | 10/2011 | Neeli | F01D 11/001 416/223 R |
| 2012/0027582 | A1 * | 2/2012 | Natarajan | F01D 11/025 415/229 |
| 2012/0288360 | A1 | 11/2012 | Kuwamura et al. | |
| 2015/0300190 | A1 | 10/2015 | Matsumoto et al. | |
| 2018/0355979 | A1 * | 12/2018 | Nishikawa | B24B 9/00 |
| 2019/0072185 | A1 * | 3/2019 | Morinaka | F16J 15/4472 |
| 2019/0136863 | A1 * | 5/2019 | Morinaka | F04D 29/106 |
| 2019/0186637 | A1 * | 6/2019 | Morinaka | F01D 11/02 |
| 2019/0234416 | A1 * | 8/2019 | Morinaka | F04D 29/28 |

FOREIGN PATENT DOCUMENTS

| | | |
|---|---|---|
| JP | 2015-096729 A | 5/2015 |
| KR | 2012-0092161 A | 8/2012 |
| KR | 2015-0055051 A | 5/2015 |

* cited by examiner

LABYRINTH SEAL

TECHNICAL FIELD

The present invention relates to a labyrinth seal provided in a rotary machine.

BACKGROUND ART

For example, Patent Document 1 discloses a labyrinth seal for inhibiting leakage of fluid passing from the high-pressure side to the low-pressure side through a gap between a rotating body and a stationary body that configure a rotary machine. This labyrinth seal mainly includes a step structure formed on an outer circumferential surface of the rotating body and fins provided on an inner circumferential surface of the stationary body.

FIG. 7 is a schematic cross-sectional view showing a conventional labyrinth seal. According to the labyrinth seal of Patent Document 1, as shown in FIG. 7, a flow P of the fluid passing from the high-pressure side to the low-pressure side through a gap between an outer circumferential surface of a rotating body 101 and fins 103, 104 provided on an inner circumferential surface of a stationary body 102 is generated. At this time, a large vortex V1 is formed between the fin 103 on the high-pressure side and the fin 104 on the low-pressure side, and a small vortex V2 is formed on the side of a step 101a. Then, fluid friction is generated in the vortices V1 and V2 and therefore energy loss occurs; thereby, the fluid leakage can be inhibited.

CITATION LIST

Patent Document

Patent Document 1: JP 2012-72736 A

SUMMARY OF THE INVENTION

As described above, the conventional labyrinth seal is configured such that in addition to the vortex V1, the vortex V2 is formed and thus the amount of leakage of the fluid can be reduced. However, as shown in FIG. 7, the vortex V2 has a flattened shape and thus the labyrinth seal is not configured to increase the flow rate of the vortex V2 by actively drawing the flow P. Therefore, fluid energy loss caused by the vortex V2 is limited and there is room for improvement in this respect.

The present invention is thus made in view of the above problem, and it is an object of the present invention to enhance the effect of inhibiting fluid leakage by increasing fluid energy loss caused by a vortex.

In order to achieve the above object, a labyrinth seal according to the present invention is configured to inhibit leakage of fluid passing axially from the high-pressure side to the low-pressure side through a gap between an outer circumferential surface of a rotating body rotatable about an axis of rotation and an inner circumferential surface of a stationary body provided outward of the rotating body, wherein a step is formed on the outer circumferential surface of the rotating body such that a diameter of the rotating body is smaller on the low-pressure side than on the high-pressure side, a fin extending radially inward from the inner circumferential surface of the stationary body is provided at least on the low-pressure side of the step, and an annular groove is formed in the outer circumferential surface of the rotating body to circumferentially extend and to be located in at least a portion of an area between the step and the fin that is provided close to the low-pressure side compared to the step.

According to the present invention, as described in detail below, the fluid flow from the high-pressure side to the low-pressure side can be drawn into the annular groove, and the flow rate of vortex in the annular groove can be increased. As a result, fluid energy loss caused by the vortex in the annular groove can be increased and thus the effect of inhibiting fluid leakage can be enhanced.

DESCRIPTION OF EMBODIMENTS

[First Embodiment]

Figure 1:
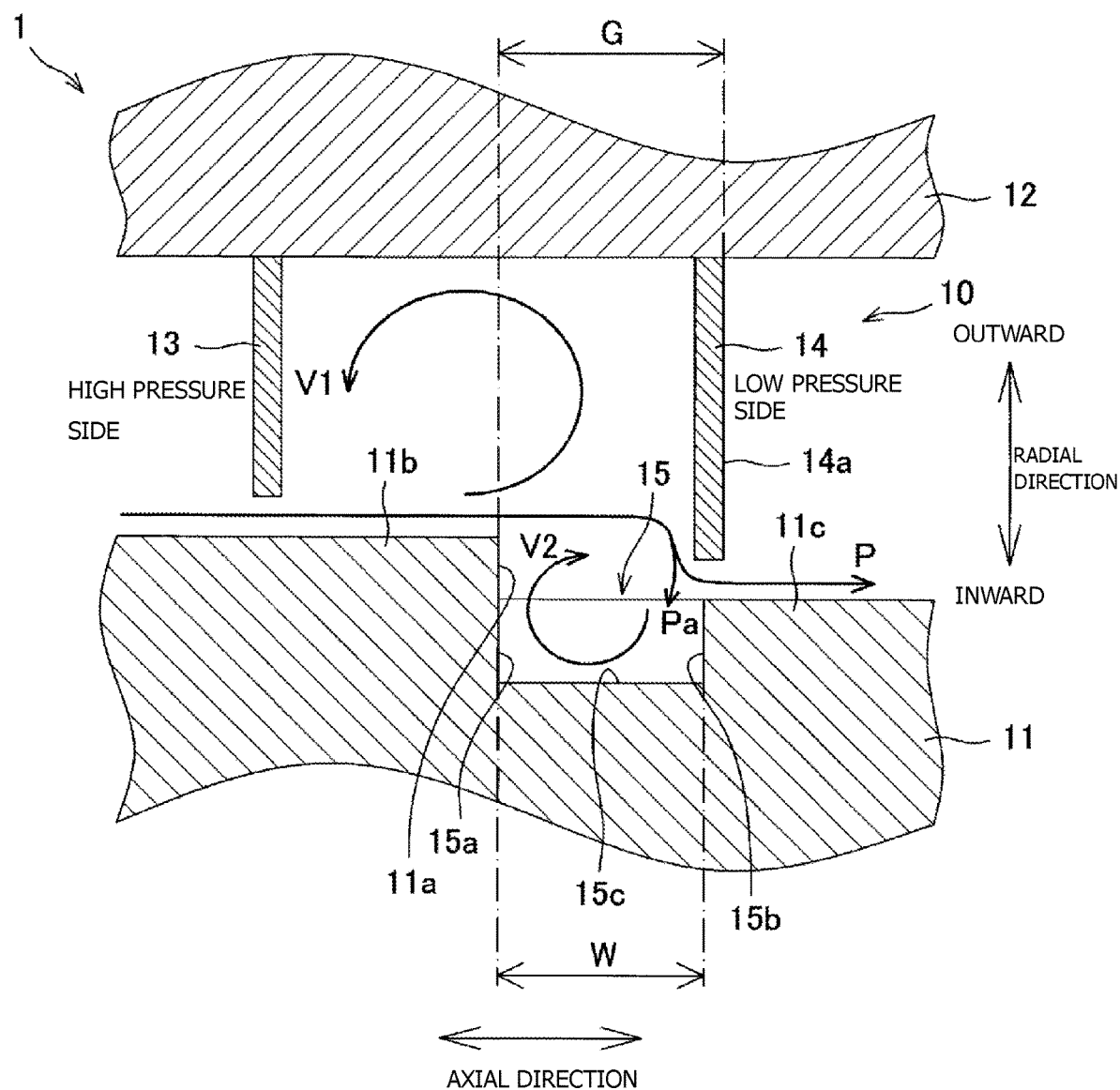
FIG. 1 is a schematic cross-sectional view showing a labyrinth seal according to a first embodiment of the present invention.

A labyrinth seal according to a first embodiment of the present invention will be described. FIG. 1 is a schematic cross-sectional view showing the labyrinth seal according to the first embodiment, and more specifically, FIG. 1 shows a cross-section including an axis of rotation of a rotating body. A rotary machine 1 including a labyrinth seal 10 of the first embodiment is configured such that a rotating body 11 and a stationary body 12 are arranged in a casing (not shown), and the rotary machine 1 functions, for example, as a turbocompressor.

The rotating body 11 is attached via a bearing (not shown) to the casing and is configured to be rotatable about the axis of rotation. Meanwhile, the stationary body 12 is fixed to the casing while being arranged radially outward of the rotating body 11 with being spaced apart therefrom. The labyrinth seal 10 mainly includes: a step structure configured by a step 11a formed on an outer circumferential surface of the rotating body 11; and fins 13, 14 provided on an inner circumferential surface of the stationary body 12. The labyrinth seal 10 inhibits leakage of fluid passing axially from the high-pressure side (the left side in FIG. 1) to the low-pressure side (the right side in FIG. 1) through a gap between the outer circumferential surface of the rotating body 11 and the inner circumferential surface of the stationary body 12.

The step 11a is formed on the outer circumferential surface of the rotating body 11 to extend radially such that a diameter of the rotating body 11 is larger on the high-pressure side than on the low-pressure side. Thus, a portion of the rotating body 11, which is located on the high-pressure side of the step 11a is a large diameter portion 11b and a portion of the rotating body 11, which is located on the low-pressure side of the step 11a is a small diameter portion 11c.

The fins 13, 14 each formed in a ring shape and extending radially inward from the inner circumferential surface of the stationary body 12 close to the outer circumferential surface of the rotating body 11 are provided on the stationary body 12. The fin 13 is arranged axially close to the high-pressure side compared to the step 11a, that is, in an area opposite to the large diameter portion 11b. Meanwhile, the fin 14 is arranged axially close to the low-pressure side compared to the step 11a, that is, in an area opposite to the small diameter portion 11c.

An annular groove 15 is formed to extend circumferentially in the outer circumferential surface of the small diameter portion 11c of the rotating body 11. The annular groove 15 is configured to include: a high-pressure-side side surface 15a substantially parallel to the radial direction; a low-pressure-side side surface 15b substantially parallel to the radial direction; and a bottom 15c substantially parallel to the axial direction. In the cross-section (the cross-section shown in FIG. 1) including the axis of rotation of the rotating body 11, the outline of the annular groove 15 has a rectangular shape with its radially outer side open. The high-pressure-side side surface 15a is flush with the step 11a and is located at the same axial position as the step 11a. Meanwhile, the low-pressure-side side surface 15b is in a location separated from the high-pressure-side side surface 15a toward the low-pressure side by an opening width W of the annular groove 15.

Here, the fin 14 extends radially inward of the outer circumferential surface of the large diameter portion 11b. Therefore, the fluid that has passed through a gap between a distal end of the fin 13 and the outer circumferential surface of the rotating body 11 does not flow linearly and axially but forms a main flow P curved radially inward just before the fin 14 as shown in FIG. 1. Specifically, the main flow P passes through the gap between the fin 13 on the high-pressure side and the large diameter portion 11b, thereafter substantially axially flowing from the high-pressure side to the low-pressure side to move radially inward right before the fin 14 on the low-pressure side. Afterward, the main flow P flows again substantially axially while passing through a gap between the fin 14 and the small diameter portion 11c.

Along with the formation of the main flow P, a relatively large vortex V1 counterclockwise in the FIG. 1 is formed between the fin 13 on the high-pressure side and the fin 14 on the low-pressure side, and a relatively small vortex V2 clockwise in FIG. 1 is formed between the step 11a and the fin 14 on the low-pressure side (in an area including the annular groove 15). Fluid friction is generated in these vortices V1 and V2 and energy loss occurs; thereby, the fluid leakage can be inhibited.

[Effect]

Figure 7:
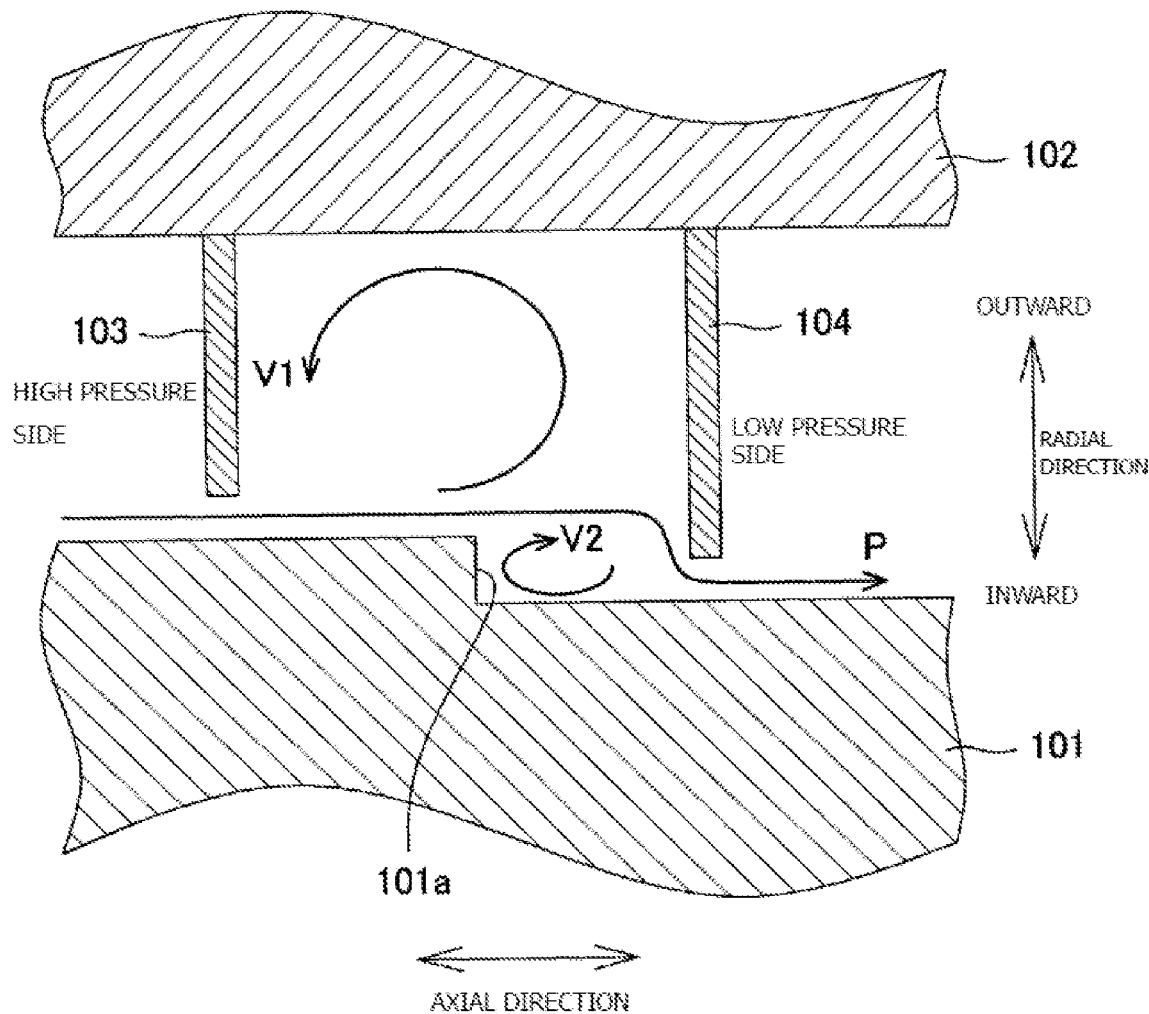
FIG. 7 is a schematic cross-sectional view showing a conventional labyrinth seal.

In the labyrinth seal 10 according to the first embodiment, the annular groove 15 of an annular shape is formed in the outer circumferential surface of the rotating body 11 to circumferentially extend and to be located in at least a portion of an area between the step 11a and the fin 14 that is provided close to the low-pressure side compared to the step 11a. Therefore, the main flow P moving from the high-pressure side toward the low-pressure side comes into contact with the fin 14 on the low-pressure side. In that case, a branched flow Pa moving radially inward toward the annular groove 15 is generated and therefore the flow rate of the vortex V2 formed in the annular groove 15 can be increased. Also, the annular groove 15 is provided and thus the vortex V2 is formed into a substantially circular shape. Accordingly, the vortex V2 can be expanded compared to the conventional flattened vortex V2 (see FIG. 7). As just described, the flow rate of the vortex V2 is increased and the vortex V2 is expanded; thereby, flow friction in the vortex V2 is increased. As a result, fluid energy loss caused by the vortex V2 can be increased and the effect of inhibiting fluid leakage can be enhanced.

In addition, in order to achieve the foregoing effect, the annular groove 15 only needs to be formed axially in at least a portion of the area between the step 11a and the fin 14 on the low-pressure side. As in the first embodiment, the annular groove 15 is formed to extend axially from the position of the step 11a toward the low-pressure side. In other words, more preferably, the annular groove 15 extends toward the high-pressure side to the position of the step 11a. As just described, the annular groove 15 is widely formed to extend toward the high-pressure side to the limit and thereby the volume of the annular groove 15 can be increased. Consequently, the vortex V2 can be further expanded. As a result, the fluid energy loss in the vortex V2 can be further increased.

Figure 2:
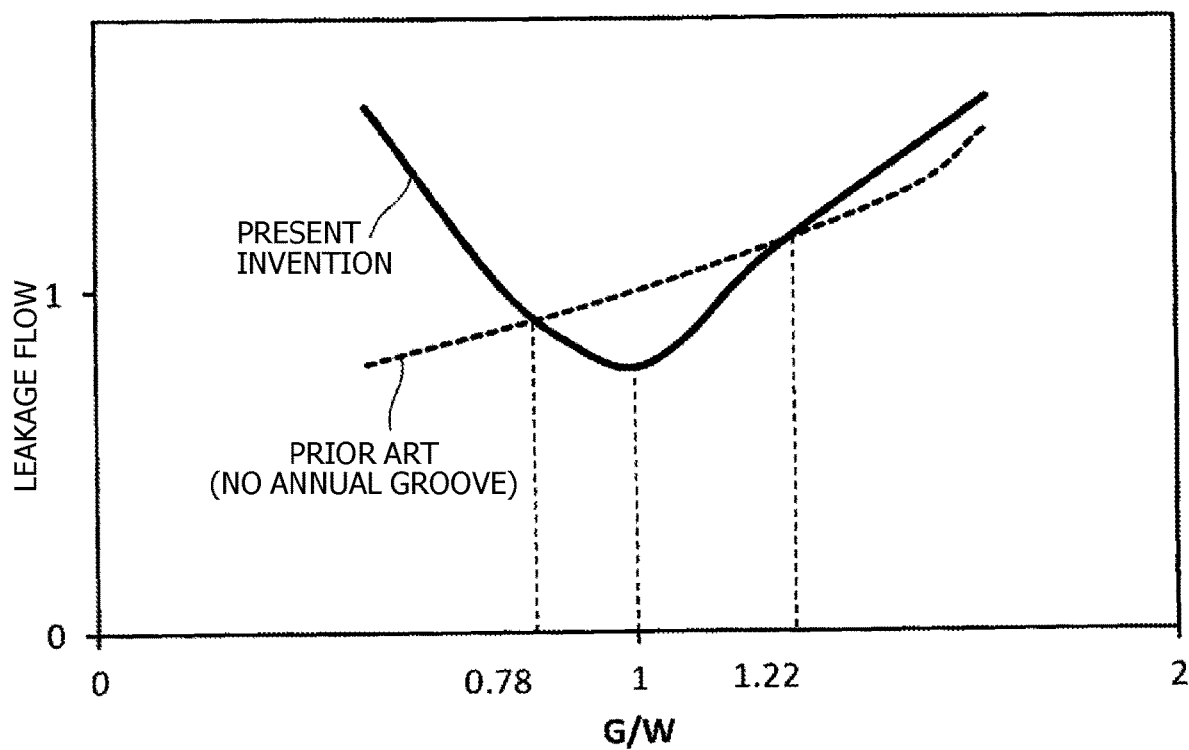
FIG. 2 is a graph showing the variation in the amount of leakage in accordance with G/W.

Moreover, the inventors have earnestly considered a preferable extent to which the annular groove 15 extends toward the low-pressure side in a case where the annular groove 15 is formed from the position of the step 11a toward the low-pressure side as described above. As a result, when the opening width of the annular groove 15 is defined as W and an axial distance between the step 11a and a low-pressure-side surface 14a of the fin 14 on the low-pressure side is defined as G, it has been found that as shown in FIG. 2, the amount of leakage flow varies in accordance with a rate of G to W (G/W). Also, in FIG. 2, the amount of leakage on the vertical axis is in dimensionless unit.

When the opening width W of the annular groove 15 is too small compared to the distance G, that is, when the low-pressure-side side surface 15b of the annular groove 15 is too separated from the fin 14, the branched flow Pa is less likely to flow into the annular groove 15 and therefore the flow rate of the vortex V2 is less likely to be increased. Consequently, the effect of inhibiting leakage may be reduced. On the other hand, when the opening width W of the annular groove 15 is too large compared to the distance G, that is, when the annular groove 15 extends far beyond the fin 14 toward the low-pressure side, the gap between a distal end of the fin 14 and the small diameter portion 11c is increased; therefore, the leakage may be facilitated.

Thus, as clear from FIG. 2, G/W is set to be greater than 0.78 and smaller than 1.22 ($0.78 < G/W < 1.22$); thereby, the amount of leakage can be remarkably reduced compared to the prior art where an annular groove is not provided. More preferably, G/W is about 1.0, that is, the low-pressure-side surface 14a of the fin 14 is located at substantially the same axial position as the low-pressure-side side surface 15b of the annular groove 15; therefore, the maximum effect of inhibiting leakage can be achieved.

[Second Embodiment]

Figure 3:
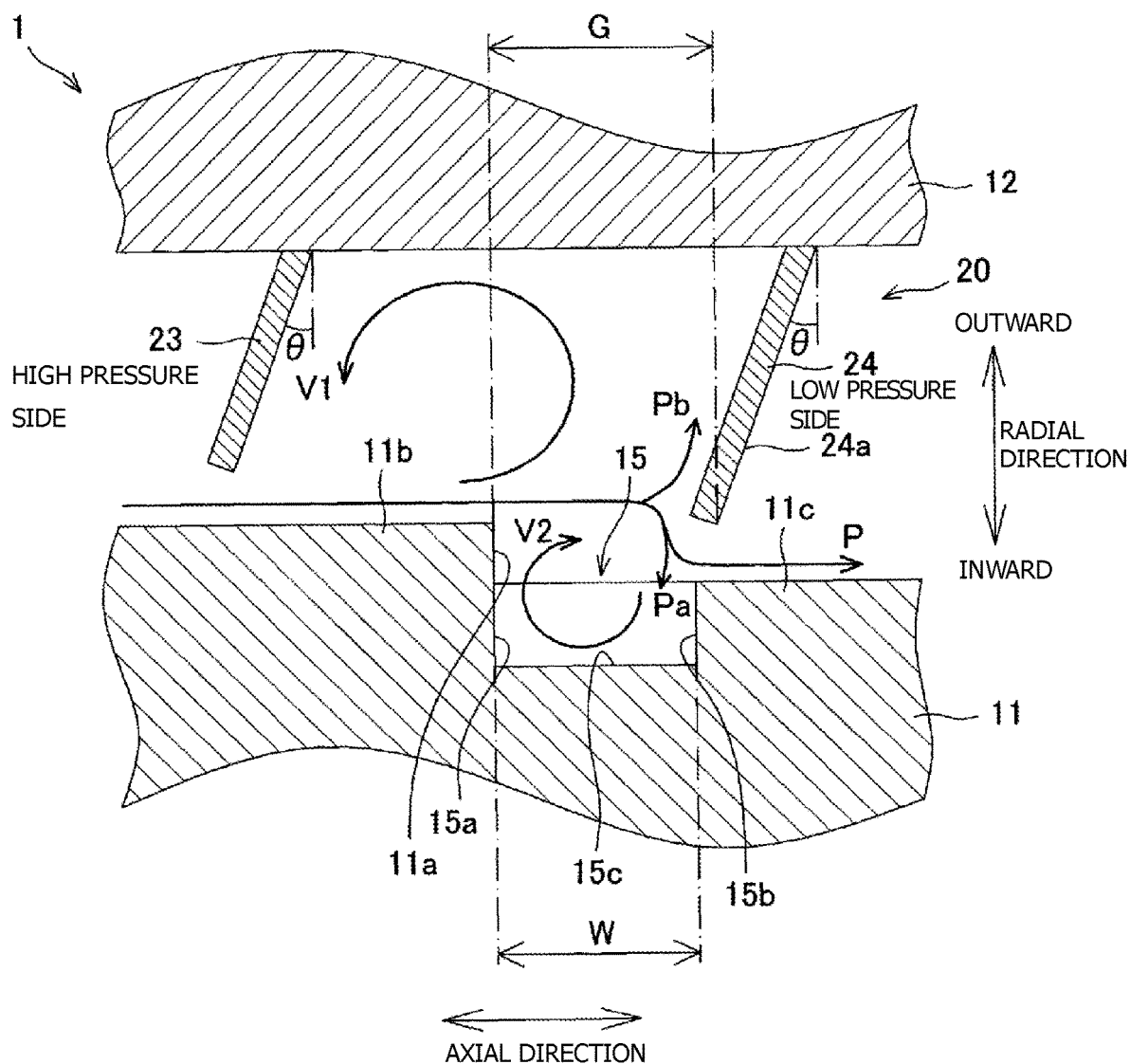
FIG. 3 is a schematic cross-sectional view showing a labyrinth seal according to a second embodiment of the present invention.

A labyrinth seal according to a second embodiment of the present invention will be described. FIG. 3 is a schematic cross-sectional view showing the labyrinth seal according to the second embodiment. A labyrinth seal 20 of the second embodiment is different from that of the first embodiment in that fins 23, 24 are inclined at an inclination angle of θ with respect to the radial direction, but otherwise basically the same as the first embodiment. Therefore, descriptions of the configurations (designated by the same reference numbers as in FIG. 1) coinciding with the first embodiment and the effects achieved by the configurations will be omitted accordingly.

In the second embodiment, the fin 23 on the high-pressure side is inclined radially toward the high-pressure side at the inclination angle of θ such that a distal end (radially inner end) thereof is located close to the high-pressure side compared to a proximal end (radially outer end) thereof, and the fin 24 on the low-pressure side is inclined radially toward the high-pressure side at the inclination angle of θ such that a distal end (radially inner end) thereof is located close to the high-pressure side compared to a proximal end (radially outer end) thereof. It is not necessary that the fin 23 on the high-pressure side has the same inclination angle as that of the fin 24 on the low-pressure side. Alternatively, the inclination angles of the fins 23, 24 may be different from each other. Also, only the fin 24 on the low-pressure side may be inclined while the fin 23 on the high-pressure side is not inclined.

[Effect]

As in the labyrinth seal 20 of the second embodiment, the distal end of the fin 24 provided close to the low-pressure side compared to the step 11a is located close to the high-pressure side compared to the proximal end of the fin 24. In such a case, when the main flow P comes into contact with the fin 24, a branched flow Pb moving radially outward is likely to be generated and therefore the flow rate of the vortex V1 can be increased. As a result, fluid energy loss in the vortex V1 can be increased and the effect of inhibiting fluid leakage can be further enhanced.

In addition, a configuration to achieve the foregoing effect is not limited to the configuration where the fin 24 on the low-pressure side is inclined. For example, the fin 24 may have a curved shape or a bent shape such as an L-shape such that the distal end of the fin 24 is located close to the high-pressure side compared to the proximal end of the fin 24.

Also, the result shown in FIG. 2 applies equally to the second embodiment; however, in a case where the fin 24 is inclined as in the second embodiment, the distance G is, as shown in FIG. 3, defined as an axial distance between a distal end of a low-pressure-side surface 24a of the fin 24 and the step 11a.

[Third Embodiment]

Figure 4:
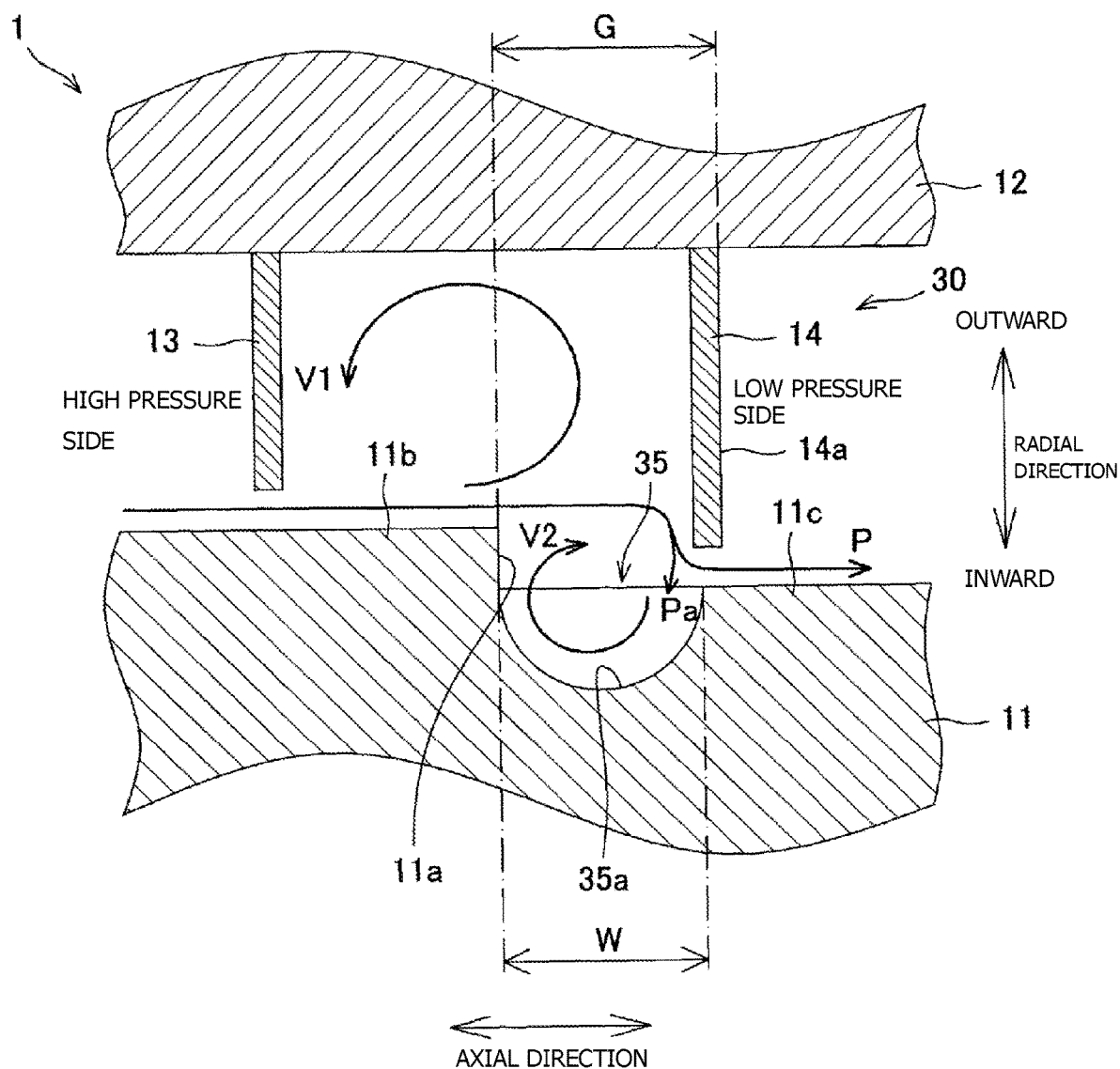
FIG. 4 is a schematic cross-sectional view showing a labyrinth seal according to a third embodiment of the present invention.

A labyrinth seal according to a third embodiment of the present invention will be described. FIG. 4 is a schematic cross-sectional view showing the labyrinth seal according to the third embodiment. A labyrinth seal 30 of the third embodiment is different from that of the first embodiment in that an annular groove 35 has a cross-sectional arc shape, but otherwise basically the same as the first embodiment. Therefore, descriptions of the configurations (designated by the same reference numbers as in FIG. 1) coinciding with the first embodiment and the effects achieved by the configurations will be omitted accordingly.

In the third embodiment, in the cross-section (the cross-section shown in FIG. 4) including the axis of rotation of the rotating body 11, the outline of the annular groove 35 has an arc shape. More specifically, the annular groove 35 has a cross-sectional semicircular shape having a diameter as an opening width W of the annular groove 35. Therefore, tangent lines on the periphery of the opening of the annular groove 35 are identical to the radial direction and fluid can be smoothly drawn into the annular groove 35.

[Effect]

In a case where, as in the labyrinth seal 30 of the third embodiment, the outline of the annular groove 35 has an arc shape in the cross-section including the axis of rotation, the vortex V2 flows along the annular groove 35; thereby, friction between the vortex V2 and a bottom of the arc shape is increased. Accordingly, fluid energy loss in the vortex V2 can be increased. Therefore, the effect of inhibiting fluid leakage can be further enhanced.

[Fourth Embodiment]

Figure 5:
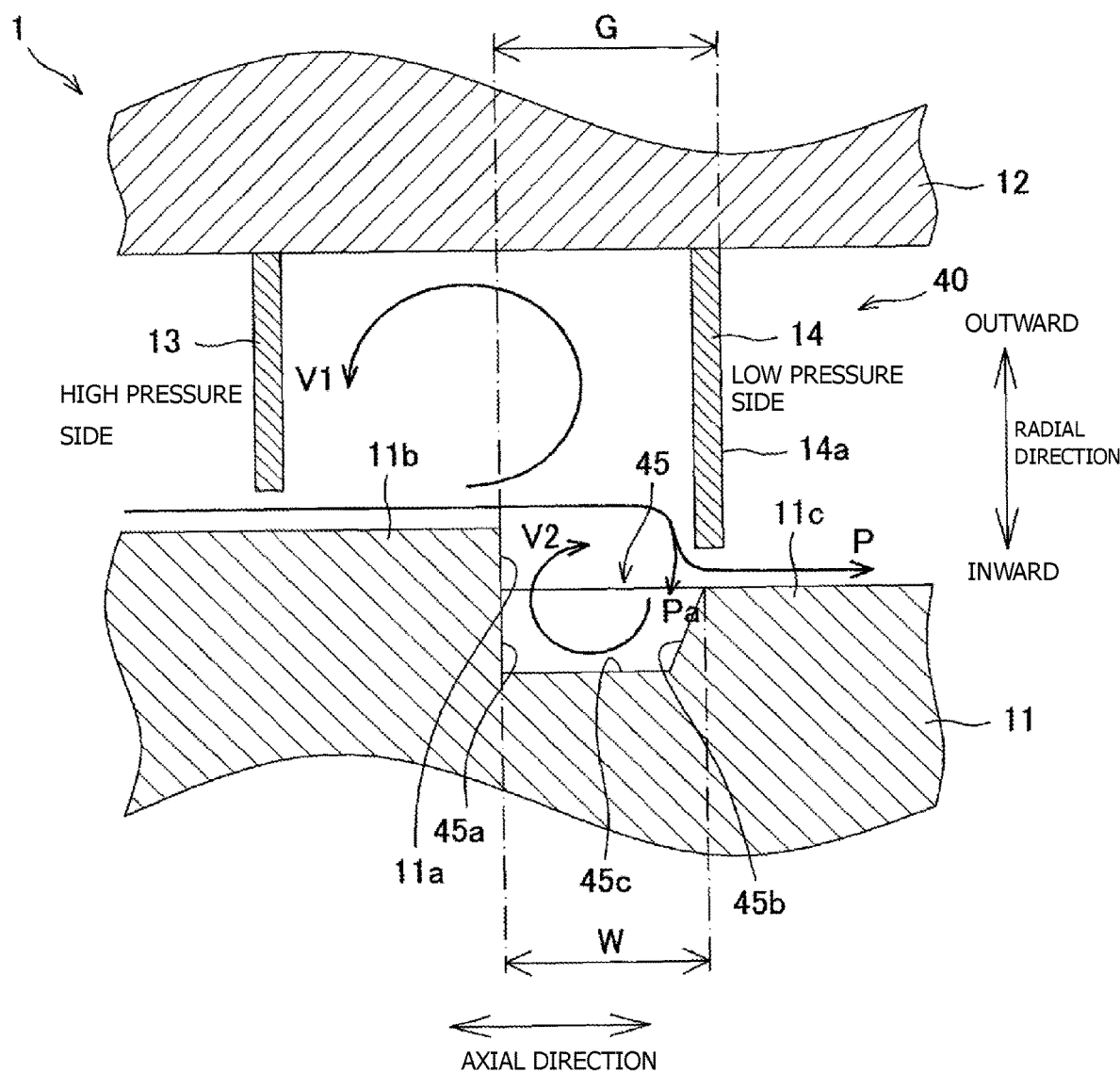
FIG. 5 is a schematic cross-sectional view showing a labyrinth seal according to a fourth embodiment of the present invention.

A labyrinth seal according to a fourth embodiment of the present invention will be described. FIG. 5 is a schematic cross-sectional view showing the labyrinth seal according to the fourth embodiment. A labyrinth seal 40 of the fourth embodiment is different from that of the first embodiment in that a low-pressure-side side surface 45b of an annular groove 45 is an inclined surface, but otherwise basically the same as the first embodiment. Therefore, descriptions of the configurations (designated by the same reference numbers as in FIG. 1) coinciding with the first embodiment and the effects achieved by the configurations will be omitted accordingly.

In the fourth embodiment, in the cross-section (the cross-section shown in FIG. 5) including the axis of rotation of the rotating body 11, the outline of the annular groove 45 has a trapezoidal shape with its radially outer side open. More specifically, the annular groove 45 is configured to include a high-pressure-side side surface 45a, the low-pressure-side side surface 45b, and a bottom 45c. The low-pressure-side side surface 45b is an inclined surface inclined closer to the high-pressure side toward the bottom 45c. In other words, the low-pressure-side side surface 45b is formed in such a shape that a radially inner (bottom side) end is located on the high-pressure side of a radially outer (opening side) end. In addition, in the same way as in the first embodiment, the high-pressure-side side surface 45a is flush with the step 11a.

[Effect]

As long as, as in the labyrinth seal 40 of the fourth embodiment, the low-pressure-side side surface 45b of the annular groove 45 is formed in such a shape that the radially inner end thereof is located close to the high-pressure side compared to the radially outer end thereof in the cross-section including the axis of rotation, the radially inward branched flow Pa generated by contact of the main flow P with the fin 14 on the low-pressure side is allowed to more flow into the annular groove 45. Therefore, the flow rate of the vortex V2 can be increased and fluid energy loss in the vortex V2 is increased. Consequently, the effect of inhibiting fluid leakage can be further enhanced.

In addition, a configuration to achieve the foregoing effect is not limited to the configuration where the low-pressure-side side surface 45b of the annular groove 45 is inclined. For example, the side surface 45b may be a curved surface curved closer to the high-pressure side toward the bottom 45c.

[Other Embodiment]

In addition, the present invention is not limited to the above embodiments, and without departing from the spirit of the present invention, elements of each of the above embodiments can be combined as appropriate or various alterations can be made to the present invention.

For example, in each of the above embodiments, the fin 13, 23 provided close to the high-pressure side compared to the step 11a can be omitted.

Also, in each of the above embodiments, a high-pressure-side end of the annular groove 15, 35, 45 is located at the same axial position as the step 11a but may be located close to the low-pressure side compared to the step 11a.

Further, in each of the above embodiments, the fin 13, 14, 23, 24 is described as a separate member from the stationary body 12 but may be integrally configured with the stationary body 12.

Furthermore, a case where the step structure of the rotating body 11 configuring the labyrinth seal of the present invention has a two-step structure including the singe step 11a is described in each of the above embodiments. Alternatively, the present invention can be applied to a case where a rotating body 51 has a step structure including three or more steps as shown in FIG. 6.

Figure 6:
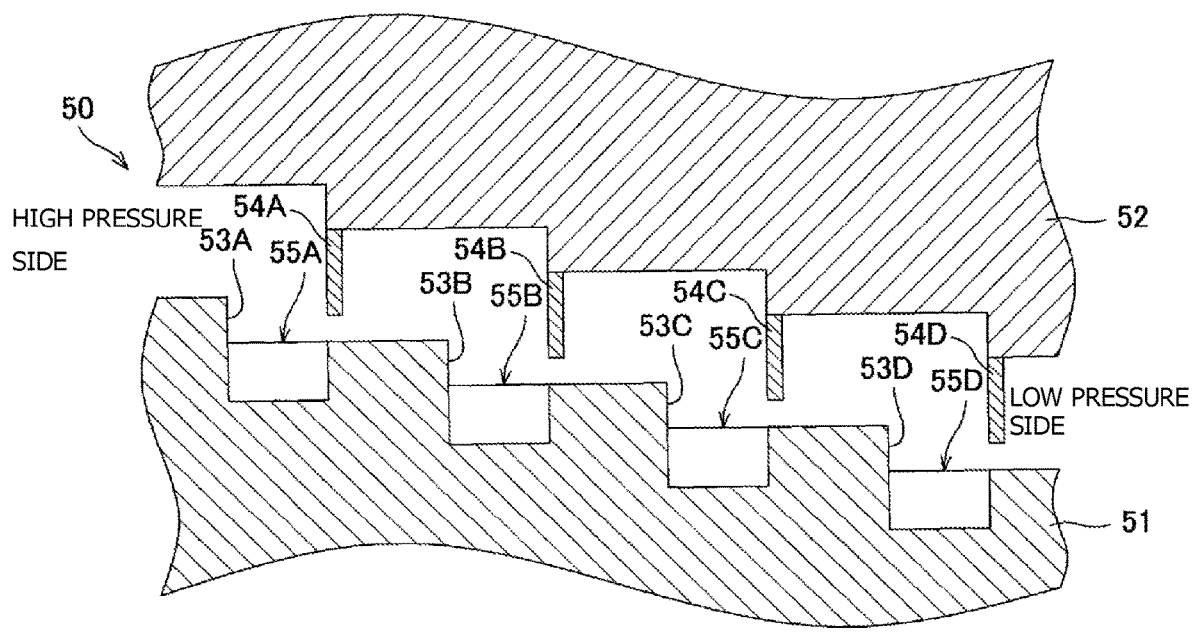
FIG. 6 is a schematic cross-sectional view showing a labyrinth seal including plural steps.

A labyrinth seal 50 shown in FIG. 6 is configured to mainly include: four steps 53A to 53D formed on an outer circumferential surface of the rotating body 51; and four fins 54A to 54D formed on an inner circumferential surface of a stationary body 52. The fins 54A to 54D are provided on the low-pressure side (small diameter side) of the respective steps 53A to 53D. Respective annular grooves 55A to 55D are formed in the outer circumferential surface of the rotating body 51 to be located in at least a portion of an area between the step 53A and the fin 54A, at least a portion of an area between the step 53B and the fin 54B, at least a portion of an area between the step 53C and the fin 54C, and at least a portion of an area between the step 53D and the fin 54D. In addition, each of the fins 54A to 54D or each of the annular grooves 55A to 55D may take the configuration, for example, shown in each of the above embodiments.

As described above, according to the labyrinth seal 50 including: the plural steps 53A to 53D formed on the outer circumferential surface of the rotating body 51 such that the diameter of the rotating body 51 gradually decreases from the high-pressure side to the low-pressure side; the fins 54A to 54D provided at least on the low-pressure side of the steps 53A to 53D, respectively; and the respective annular grooves 55A to 55D provided between the step 53A and the fin 54A, between the step 53B and the fin 54B, between the step 53C and the fin 54C, and between the step 53D and the fin 54D, the effect of reducing fluid leakage can be further enhanced.

The present application is based on Japanese Patent Application No. 2015-134119, filed on Jul. 3, 2015, the content of which is herein incorporated by reference.

EXPLANATION OF REFERENCE NUMERALS 10, 20, 30, 40, 50 Labyrinth seal
11, 51 Rotating body
11a, 53A to 53D Step
12, 52 Stationary body
13, 14, 23, 24, 54A to 54D Fin
15, 35, 45, 55A to 55D Annular groove

The invention claimed is:

1. A labyrinth seal comprising:
a rotating body rotatable about an axis of rotation and having an outer circumferential surface;
a stationary body provided radially outward of the rotating body and having an inner circumferential surface;
a gap being formed between the inner circumferential surface and the outer circumferential surface;
wherein the labyrinth seal is configured to inhibit leakage of fluid passing axially from a high-pressure side to a low-pressure side through the gap,
wherein the labyrinth seal further comprising:
a step formed on the outer circumferential surface of the rotating body such that the rotating body has a large diameter portion on the high-pressure side and a small diameter portion on the low-pressure side so that an annular surface viewing from a point on the rotation axis is formed at a boundary between the large diameter portion and the small diameter portion,
a fin extending radially inward from the inner circumferential surface of the stationary body is provided at least on the low-pressure side of the step, and
an annular groove formed in the outer circumferential surface of the rotating body to circumferentially extend and to be located in at least a portion of an area between the step and the fin that is provided close to the low-pressure side compared to the step,
wherein the annular groove has a low-pressure-side side surface and a high-pressure-side side surface where the high-pressure-side side surface is flush with the annular surface of the step.

2. The labyrinth seal according to claim 1, wherein a distal end of the fin that is provided close to the low-pressure side compared to the step is located close to the high-pressure side compared to a proximal end of the fin.

3. The labyrinth seal according to claim 1, wherein an outline of the annular groove has an arc shape in a cross-section including the axis of rotation.

4. The labyrinth seal according to claim 2, wherein an outline of the annular groove has an arc shape in a cross-section including the axis of rotation.

5. The labyrinth seal according to claim 1, wherein in a cross-section including the axis of rotation, a low-pressure-side side surface of the annular groove has such a shape that a radially inner end thereof is located close to the high-pressure side compared to a radially outer end thereof.

6. The labyrinth seal according to claim 2, wherein in a cross-section including the axis of rotation, a low-pressure-side side surface of the annular groove has such a shape that a radially inner end thereof is located close to the high-pressure side compared to a radially outer end thereof.

7. The labyrinth seal according to claim 1, wherein the annular groove is formed to extend axially from a position of the step toward the low-pressure side.

8. The labyrinth seal according to claim 7, wherein when an axial distance between the step and a distal end of a low-pressure-side surface of the fin that is provided close to the low-pressure side compared to the step is defined as G and an axial opening width of the annular groove is defined as W, $0.78 < G/W < 1.22$ is satisfied.

9. The labyrinth seal according to claim 1, wherein a plurality of the steps is formed on the outer circumferential surface of the rotating body such that the diameter of the rotating body gradually decreases from the high-pressure side toward the low-pressure side, and the fin is provided at least close to the low-pressure side compared to each of the steps.

10. The labyrinth seal according to claim 2, wherein the annular groove is formed to extend axially from a position of the step toward the low-pressure side.

11. The labyrinth seal according to claim 3, wherein the annular groove is formed to extend axially from a position of the step toward the low-pressure side.

12. The labyrinth seal according to claim 4, wherein the annular groove is formed to extend axially from a position of the step toward the low-pressure side.

13. The labyrinth seal according to claim 5, wherein the annular groove is formed to extend axially from a position of the step toward the low-pressure side.

14. The labyrinth seal according to claim 6, wherein the annular groove is formed to extend axially from a position of the step toward the low-pressure side.

15. The labyrinth seal according to claim 1, wherein an annular groove has a high-pressure-side surface and a low-pressure-side side surface formed on the outer circumferential surface of the rotating body, and wherein an axial position of a distal end of the fin is substantially same as an axial position of the low-pressure-side side surface of the annular groove.

* * * * *